(12) United States Patent
Niarfeix

(10) Patent No.: US 9,822,813 B2
(45) Date of Patent: Nov. 21, 2017

(54) SELF-ADJUSTING INSTRUMENTED BEARING AND MECHANICAL SYSTEM EQUIPPED WITH SUCH A BEARING

(71) Applicant: Francois Niarfeix, Saint-Cyr (FR)

(72) Inventor: Francois Niarfeix, Saint-Cyr (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/138,272

(22) Filed: Apr. 26, 2016

(65) Prior Publication Data

US 2016/0319862 A1 Nov. 3, 2016

(30) Foreign Application Priority Data

Apr. 29, 2015 (FR) ...................................... 15 53875

(51) Int. Cl.
| | |
|---|---|
| F16C 23/08 | (2006.01) |
| F16C 19/18 | (2006.01) |
| G01P 3/44 | (2006.01) |
| F16C 41/00 | (2006.01) |
| F16C 19/38 | (2006.01) |

(52) U.S. Cl.
CPC ............ *F16C 23/082* (2013.01); *F16C 19/18* (2013.01); *F16C 23/086* (2013.01); *F16C 41/007* (2013.01); *G01P 3/443* (2013.01); *F16C 19/183* (2013.01); *F16C 19/38* (2013.01); *F16C 2233/00* (2013.01)

(58) Field of Classification Search
CPC ........ F16C 19/18; F16C 19/183; F16C 19/38; F16C 23/082; F16C 23/086; F16C 41/007; F16C 2233/00; F16C 19/28; G01P 3/443

USPC ....... 384/448, 490, 496–497, 504, 548, 558, 384/564–565, 568
See application file for complete search history.

(56) References Cited

U.S. PATENT DOCUMENTS

| | | | | |
|---|---|---|---|---|
| 4,092,053 A | * | 5/1978 | Riegler | F16C 19/52 266/245 |
| 5,685,068 A | * | 11/1997 | Bankestrom | F16C 25/06 29/407.08 |
| 6,007,250 A | * | 12/1999 | Brauer | F16C 23/084 324/173 |

(Continued)

FOREIGN PATENT DOCUMENTS

| | | | | |
|---|---|---|---|---|
| DE | 102005032222 A1 | * | 1/2007 | .............. F16C 19/52 |
| DE | 102009002546 A1 | * | 12/2009 | .............. G01K 13/08 |

(Continued)

*Primary Examiner* — Marcus Charles
(74) *Attorney, Agent, or Firm* — Bryan Peckjian; SKF USA Inc. Patent Dept.

(57) ABSTRACT

A self-adjusting instrumented rolling bearing providing an outer ring and an inner ring delimiting a rolling chamber and at least one row of rolling elements disposed therein, and a detection device including a target integral with the outer ring and a sensor integral with the inner ring, configured to detect a relative rotation between the outer ring and the inner ring around a central axis. The outer ring has an inner surface in the form of a spherical portion centered about a tilting center of the bearing and forming a rolling surface for the rolling elements. The radius of the inner surface of the outer ring is greater than a distance defined between the tilting center of the bearing and a specific position of the sensor that is the farthest from the tilting center.

19 Claims, 3 Drawing Sheets

(56) References Cited

U.S. PATENT DOCUMENTS

| | | | | |
|---|---|---|---|---|
| 6,508,128 B2* | 1/2003 | Bode | ............ | F16C 19/52 |
| | | | | 73/579 |
| 7,018,105 B2* | 3/2006 | Oka | ............ | F16C 19/386 |
| | | | | 384/448 |
| 7,063,490 B2* | 6/2006 | Ricker | ............ | F16B 4/002 |
| | | | | 411/14 |
| 7,866,894 B2* | 1/2011 | Hewitt | ............ | F16C 35/073 |
| | | | | 29/898.07 |
| 8,820,615 B2* | 9/2014 | Dahlman | ............ | F16C 33/60 |
| | | | | 228/200 |

FOREIGN PATENT DOCUMENTS

| | | | | |
|---|---|---|---|---|
| EP | 137270 | A2 | 4/1985 | |
| WO | 9630769 | A1 | 10/1996 | |
| WO | 2010064088 | A | 6/2010 | |
| WO | 2011051363 | A2 | 5/2011 | |
| WO | WO-2012152538 | A1 * | 11/2012 | ............ F16C 23/086 |

* cited by examiner

SELF-ADJUSTING INSTRUMENTED BEARING AND MECHANICAL SYSTEM EQUIPPED WITH SUCH A BEARING

CROSS-REFERENCE TO RELATED APPLICATION

This application claims priority to French patent application no. 1553875 filed on Apr. 29, 2015, the contents of which are fully incorporated herein by reference.

FIELD OF THE INVENTION

The present invention relates to a self-adjusting instrumented bearing. The invention also relates to a mechanical system provided with such a bearing.

BACKGROUND OF THE INVENTION

In known manner, a mechanical system may be equipped with a support, a shaft, and a bearing interposed between the support and the shaft for supporting and guiding the latter in rotation. The bearing may be formed by a radial contact bearing, comprising a fixed ring disposed in a housing of the support and a movable ring integral with the shaft. However, such a bearing is not optimized for certain applications, for example in a gearbox and/or in case of heavy loads. In this case, one uses a spherical bearing formed by a self-adjusting bearing, in which a ring is fixed while the other ring is tiltable. Such a bearing is used to compensate for any misalignment between the shaft axis and the axis of the housing formed in the support.

Furthermore, it is known to provide a mechanical system with an instrumented bearing for controlling its operating parameters, such as the speed of rotation of the shaft. Such a bearing usually comprises a sensor integral with the fixed ring and a target integral with the mobile ring, forming a relative rotation detection device between the rings.

WO-A-2010 064 088 describes an example of instrumented bearing. The bearing comprises an outer ring and an inner ring delimiting a rolling chamber in which is disposed a row of balls. The outer ring has an outer surface in form of a sphere portion, and in a similar manner the housing of the support has an inner surface in form of a sphere portion which is complementary with the one of the bearing, thereby forming a spherical bearing. A sensor is fixed to the support integral with the outer ring of the bearing, while a target is fixed to the inner ring of the bearing. In case of relative tilt between the rings of the bearing, there is a risk that the target impinges on the outer ring.

SUMMARY OF THE INVENTION

The purpose of the present invention is to provide an improved self-adjusting instrumented bearing.

To this end, the invention relates to a self-aligning instrumented rolling bearing comprising: an outer ring and an inner ring delimiting a rolling chamber in which is disposed at least one row of rolling elements; and a detection device including a target integral with or secured to the outer ring and a sensor integral with or secured to the inner race, configured to detect a relative rotation between the outer ring and the inner ring around a central axis. The bearing is characterized in that the outer ring has an inner surface in form of a spherical portion centered on a tilting center of the bearing and forming a rolling surface for the rolling elements; and in that the radius of the inner surface of the outer ring is greater than a distance defined between the tilting center of the bearing and a specific position of the sensor which is the farthest from the tilting center.

Thus, the invention ensures that the sensor does not hit the outer ring in the event of relative tilting between the bearing rings.

According to other advantageous features of the invention, taken alone or in combination:

A defined distance between the tilting center and a proximal position of the target which is the closest to the tilting center is greater than the distance defined between the tilting center and the specific position of the sensor. Thus, it is ensured that the sensor does not collide with the target in case of relative tilting or inclination between the bearing rings. Generally, this characteristic is intrinsic to the configuration of the detection device, in particular the shape and arrangement of the target and the sensor.

The specific position corresponds to an outer edge of the sensor.

The sensor has an outer surface in form of a sphere portion including the specific position, so that the distance defined between the tilting center and the specific position corresponds to the radius of the outer surface of the sensor.

The target has an inner surface in form of a sphere portion.

The sphere portion is centered on the tilting center of the bearing, so that a gap defined between the target and the sensor is constant regardless of the inclination of the bearing around the tilting center.

The target is fixed to a side wall of the outer ring or the inner ring.

The bearing comprises two rows of rolling elements.

The bearing is a self-aligning ball bearing or a spherical roller bearing.

The invention also relates to a mechanical system, equipped with a bearing as mentioned above.

BRIEF DESCRIPTION OF THE DRAWINGS

The invention will be better understood from reading the description which follows, given by way of example and with reference to the accompanying drawings, wherein.

DETAILED DESCRIPTION OF THE INVENTION

Figure 1:
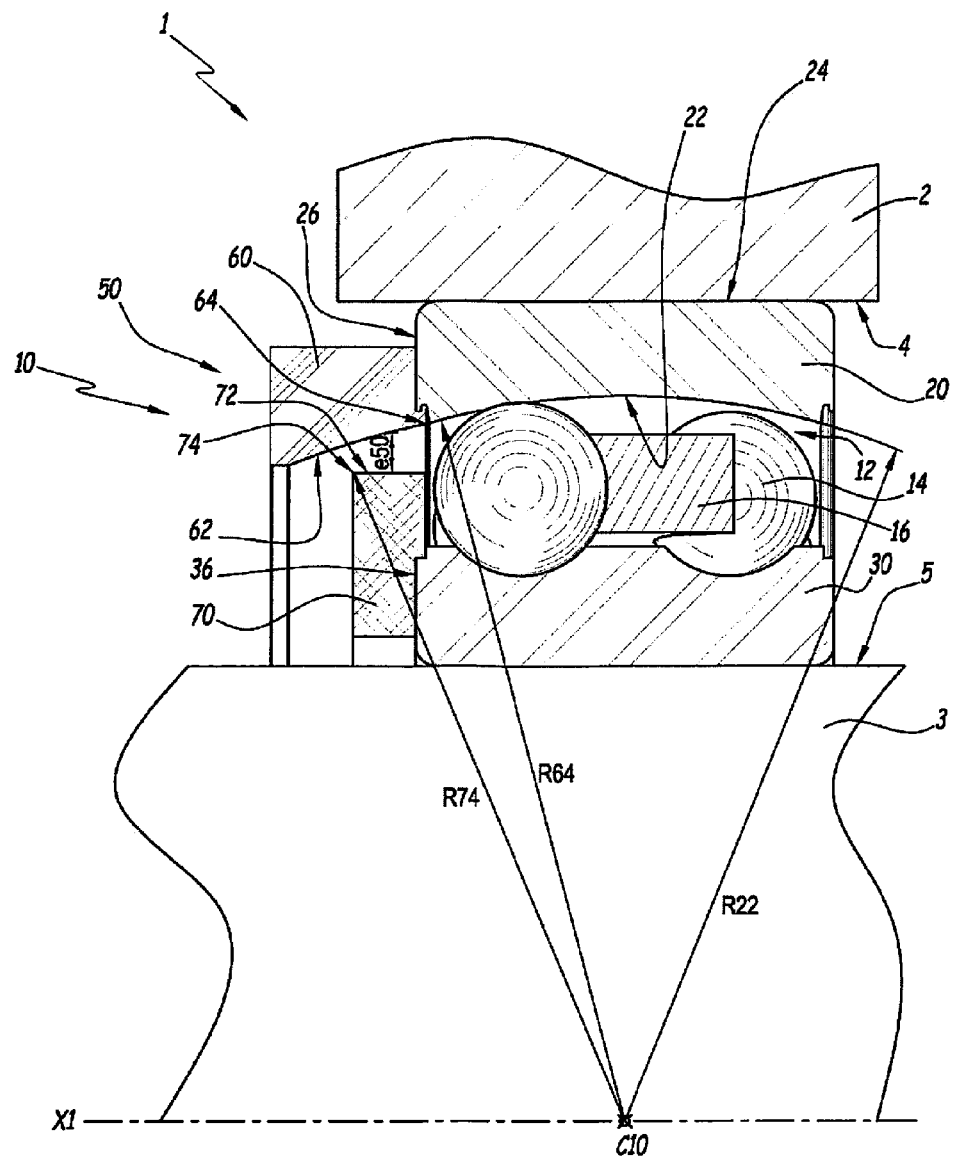
FIG. 1 is a partial sectional view of a mechanical system according to the invention, equipped with a bearing also according to the invention.

FIG. 1 shows partially a mechanical system 1 according to the invention. The system 1 comprises a support 2, a shaft 3 and a bearing 10 also according to the invention. The support 2 comprises a cylindrical bore 4, while the shaft has a cylindrical outer surface 5. The support 2 is fixed, while the shaft 3 is rotatable. When the support 2 and the shaft 3 are aligned, the bore 4 and the surface 5 are both centered on a central axis X1 of the mechanical system 1.

The bearing 10 comprises an outer ring 20 and an inner ring 30 defining a rolling chamber 12. Two rows of rolling elements 14 held by a cage 16 are disposed in the rolling chamber 12. More specifically, the rolling elements 14 are balls. The ring 20 is fixed in the bore 4 of the support 2, while the ring 30 is fixed on the surface 5 of the shaft 3.

The outer ring 20 has an inner surface 22 forming a rolling surface for the rolling elements 14 and a cylindrical outer surface 24 fitted in the bore 4. The surface 22 is in the form of a spherical portion centered on a tilting center C10 of the bearing 10, which is disposed on the central axis X1 of the system 1. The surface 22 has a radius R 22 around the center C10.

The bearing 10 is self-adjusting, that is to say that the rings 20 and 30 are pivotable relative to one another about the tilting center C10. For the targeted applications, this pivoting is generally limited to ±1.5 degrees. The bearing 10 thus allows compensating for any misalignment between the axis of the shaft 3 and the axis of the bore 4 formed in the support 2.

The bearing 10 also includes a detection device 50 including a target 60 and a sensor 70 configured to detect a relative rotation between the rings 20 and 30 around the central axis X1. The target 60 is fixed to a side wall 26 of the outer ring 20, while the sensor 70 is mounted on a side wall 36 of the inner ring 30. The target 60 has an inner surface 62 disposed opposite an outer surface 72 of the sensor 70, so that the sensor 70 may read the internal surface 62 of the target 60. A measuring gap, called air gap e50, is provided between the surfaces 62 and 72.

The target 60 has an inner edge 64 corresponding to the position of the surface 62 closest to the center C10. We denote R64 the distance between the center C10 and the edge 64. For its part, the sensor 70 has an outer edge 74 corresponding to the position of the surface 72 farthest from the center C10. We denote R74 the distance between the center C10 and the edge 74.

As the bearing 10 is self-adjusting, relative movement between the rings 20 and 30 causes relative movement between the sensor 60 and the target 70. In these conditions, one seeks to prevent the sensor 70 and specifically the edge 74 from hitting the target 60 or the ring 20. To this end, the bearing 10 is configured so that the distance R74 is smaller than radius R22 and distance R64.

The inner surface 62 of the target 60 is preferably in the form of a spherical portion. Thus, the air gap e50 defined between the target 60 and the sensor 70 remains stable regardless of the tilting of the bearing 10 around the center C10 in the angular range of ±1.5 degrees.

Figure 2:
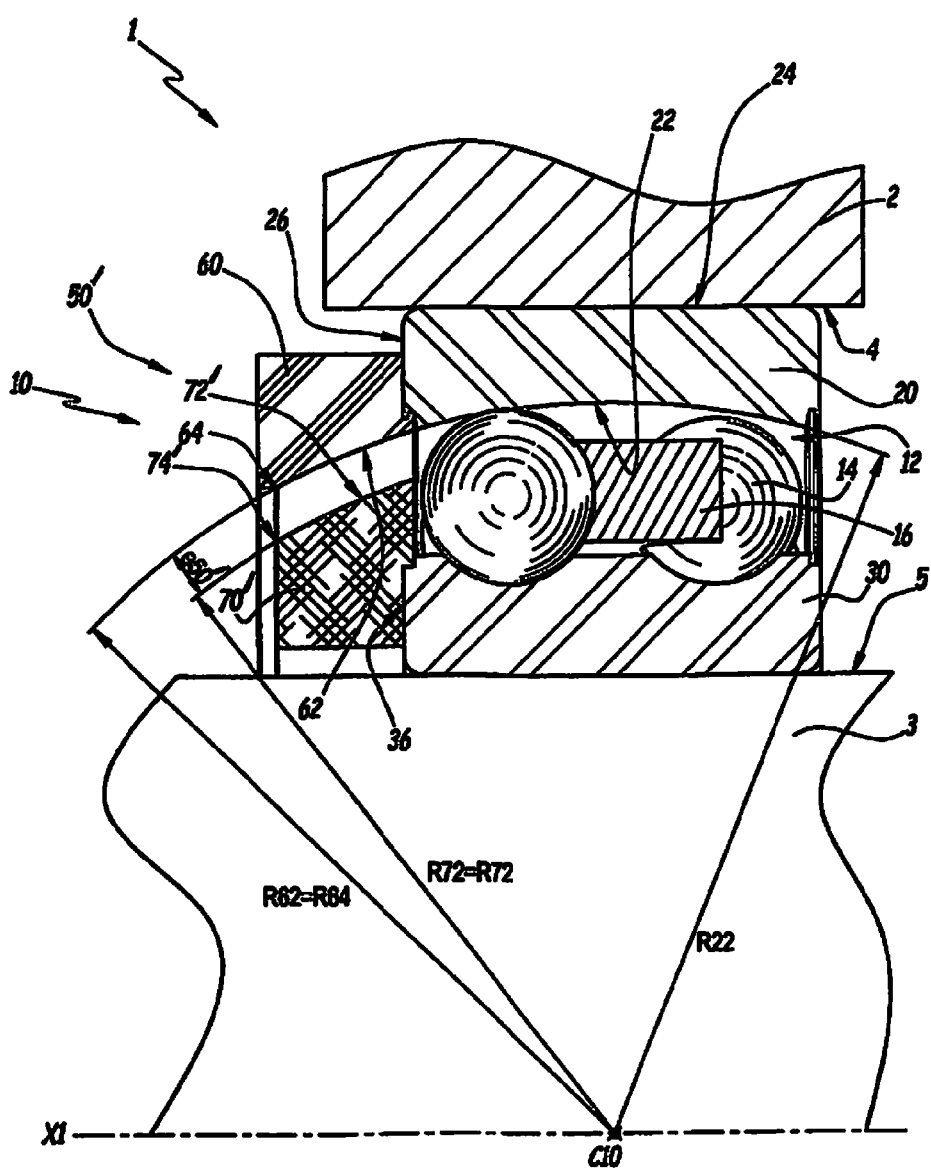
FIG. 2 is a section similar to FIG. 1 showing a rolling bearing according to a second embodiment of the invention.

FIG. 2 shows a bearing 10 according to a second embodiment of the invention, equipping the mechanical system 1. For simplification purpose, the elements of the bearing 10 similar to those of the first embodiment bear the same reference numerals. Only the differences with the first embodiment are detailed below.

The detection device 50' includes sensor'. In this second embodiment, the outer surface 72' of sensor 70' has a spherical portion including the edge 74. Therefore, the distance R74 defined between the tilting center C10 and the edge 74 corresponds to the radius R72 of the outer surface 72' of the sensor 70'. More precisely, the surface 72' is in the form of a spherical portion centered on the center C10 of the bearing 10.

In addition, the inner surface 62 of the target 60 is in the form of a spherical portion centered on the center C10. Target 60 also includes inner edge 64'. Thus, the air gap e50' defined between the target 60 and the sensor 70' is constant irrespective of the inclination of the bearing 10 around the center C10.

Furthermore, the mechanical system 1 may be shaped differently from FIGS. 1 and 2 without departing from the scope of the invention. In particular, the bearing 10 may have any configuration suitable for the intended application.

In a variant not shown, the target 60 can be attached directly to the support 2 or on an additional member integral with the ring 20 and the support 2. Whatever the embodiment, the outer ring 20 of the bearing 10 has an inner surface 22 in the form of a sphere portion centered on the tilting center C10 of the bearing and forming a rolling surface for the rolling elements 14. The radius R22 of the inner surface 22 is greater than a distance defined between the center C10 and a specific position 74 of the sensor 70 which is the farthest from the center C10.

The two embodiments described above correspond to a Self-Aligning Ball Bearing. The invention can also be implemented on other types of bearings, in particular a Spherical Roller Bearing 10.

Figure 3:
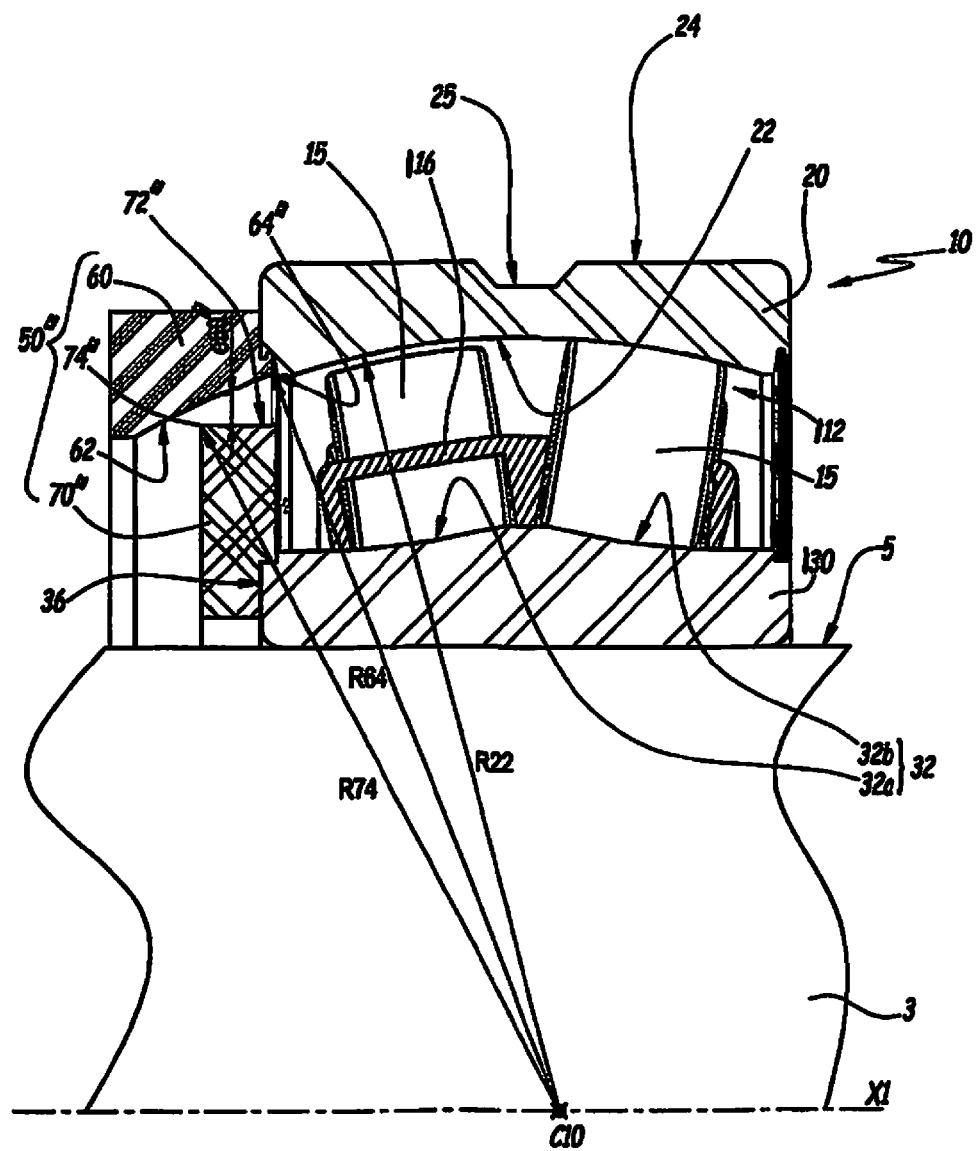
FIG. 3 is a section similar to FIGS. 1 and 2 showing a bearing according to a third embodiment of the invention.

Such a bearing 10 is shown in FIG. 3 and constitutes a third embodiment of the invention. In a simplification, the components of this bearing 10 that are comparable to those of the first embodiment bear the same reference numbers. Only the differences from the previous embodiments are mentioned below, for brevity's sake. The bearing 10 of FIG. 3 has an outer ring 20 having an inner surface 22 in the form of a spherical portion centered on a tilting center C10 of the bearing and forming a rolling surface for the rollers 15. In the example, the bearing 10 has two rows of spherical rollers 15 arranged side by side. The spherical rollers 15 each have a peripheral surface, or a rolling surface, in the form of a spherical portion. Inside the chamber 112 with the spherical rollers 15 may be a cage 116. The inner ring 130 has an outer surface 32 which is formed by two surface portions 32a and 32b. Portions 32a and 32b form a rolling surface for each row of rollers 15. In the section plane of FIG. 3, the surfaces 32a and 32b have a curved shape, the concavity of which is opposite from that of the surface 22. The center of curvature of the surface 32a is instead arranged on the side of the detection device 50, while the center of curvature of the surface 32b is disposed on the opposite side.

Surfaces 32a, 32b and 22 have substantially the same radius of curvature. This radius of curvature is also the same as that of the peripheral surface of the spherical rollers 15. Furthermore, the outer surface 24 of the outer ring 20 defines a circumferential groove 25.

In the example shown in FIG. 3, the detection device 50" is substantially the same as used in FIG. 1. More specifically, detecting device 50" comprises a target 60 secured to the outer ring 20 and a sensor 70" fixed of the inner ring 30 configured for detecting a relative rotation between the outer ring (20) and the inner ring 30 around a central axis X1. The target 60" and the sensor 70" are separated by an air gap e50". The target 60 has a target inner edge 64". As in the first embodiment, the target 60" includes an inner surface 62 in the form of a spherical portion and the sensor 70" has a cylindrical outer surface 72" centered on the axis X1.

The technical characteristics of different embodiments and the above variations may be all or for some of them combined. In particular, the detection apparatus 50 of FIG. 2 may be integrated with a spherical roller bearing as shown in FIG. 3. Thus, the mechanical system 1 and the bearing 10 can be adapted in terms of cost, functionality and performance.

The invention claimed is:
1. A self-aligning instrumented bearing comprising:
an outer ring,
an inner ring delimiting a rolling chamber having at least one row of rolling elements disposed therein; and
a detection device including a target integral with the outer ring and a sensor integral with the inner ring configured to detect a relative rotation between the outer ring and the inner ring around a central axis; wherein the outer ring has an inner surface in the form of a spherical portion centered about a tilting center of the bearing and forming a rolling surface for the rolling elements; and wherein the radius of the inner surface of the outer ring is greater than a distance defined between the tilting center of the bearing and a specific position of the sensor that is farthest from the tilting center.

2. The self-aligning instrumented bearing according to claim 1, wherein a distance defined between the tilting center and a proximal position of the target that is closest to the tilting center is greater than the distance defined between the tilting center and the specific position of the sensor.

3. The self-aligning instrumented bearing according to claim 1, wherein the specific position corresponds to an outer edge of the sensor.

4. The self-aligning instrumented bearing according to claim 1, wherein the target is fixed to a side wall of the outer ring or the inner ring.

5. The self-aligning instrumented bearing according to claim 1, further comprising two rows of rolling elements.

6. The self-aligning instrumented bearing according to claim 5, wherein the bearing further comprises a Self-Aligning Ball Bearing or a Spherical Roller Bearing.

7. A self-aligning instrumented bearing comprising:
an outer ring,
an inner ring delimiting a rolling chamber having at least one row of rolling elements disposed therein;
a detection device including a target integral with the outer ring and a sensor integral with the inner ring configured to detect a relative rotation between the outer ring and the inner ring around a central axis; wherein the outer ring has an inner surface in the form of a spherical portion centered about a tilting center of the bearing and forming a rolling surface for the rolling elements;

the radius of the inner surface of the outer ring is greater than a distance defined between the tilting center of the bearing and a specific position of the sensor that is farthest from the tilting center; and wherein the sensor has an outer surface in the form of a spherical portion including the specific position, so that the distance defined between the tilting center and the specific position corresponds to the radius of the outer surface of the sensor.

8. The self-aligning instrumented bearing according to claim 7, wherein the target is fixed to a side wall of the outer ring or the inner ring.

9. The self-aligning instrumented bearing according to claim 7, further comprising two rows of rolling elements.

10. The self-aligning instrumented bearing according to claim 9, wherein the bearing further comprises a Self-Aligning Ball Bearing or a Spherical Roller Bearing.

11. The self-aligning instrumented bearing according to claim 7, wherein a distance defined between the tilting center and a proximal position of the target that is closest to the tilting center is greater than the distance defined between the tilting center and the specific position of the sensor.

12. The self-aligning instrumented bearing according to claim 7, wherein the specific position corresponds to an outer edge of the sensor.

13. A self-aligning instrumented bearing comprising:
an outer ring,
an inner ring delimiting a rolling chamber having at least one row of rolling elements disposed therein; and
a detection device including a target integral with the outer ring and a sensor integral with the inner ring configured to detect a relative rotation between the outer ring and the inner ring around a central axis; wherein the outer ring has an inner surface in the form of a spherical portion centered about a tilting center of the bearing and forming a rolling surface for the rolling elements; and wherein the radius of the inner surface of the outer ring is greater than a distance defined between the tilting center of the bearing and a specific position of the sensor that is farthest from the tilting center, wherein the target includes an inner surface in the form of a spherical portion.

14. The self-aligning instrumented bearing according to claim 13, wherein the spherical portion is centered on the tilting center of the bearing, so that an air gap defined between the target and the sensor is constant regardless of an inclination of the bearing about the tilting center.

15. The self-aligning instrumented bearing according to claim 13, wherein the target is fixed to a side wall of the outer ring or the inner ring.

16. The self-aligning instrumented bearing according to claim 13, further comprising two rows of rolling elements.

17. The self-aligning instrumented bearing according to claim 16, wherein the bearing further comprises a Self-Aligning Ball Bearing or a Spherical Roller Bearing.

18. The self-aligning instrumented bearing according to claim 13, wherein a distance defined between the tilting center and a proximal position of the target that is closest to the tilting center is greater than the distance defined between the tilting center and the specific position of the sensor.

19. The self-aligning instrumented bearing according to claim 13, wherein the specific position corresponds to an outer edge of the sensor.

\* \* \* \* \*